United States Patent [19]

Halpern

[11] 3,870,866
[45] Mar. 11, 1975

[54] FEE CHARGING SYSTEM

[76] Inventor: John W. Halpern, 2490 Channing Way, Room 518, Berkeley, Calif. 94704

[22] Filed: Aug. 9, 1972

[21] Appl. No.: 279,148

Related U.S. Application Data

[63] Continuation-in-part of Ser. No. 197,702, Nov. 11, 1971, abandoned, and a continuation-in-part of Ser. No. 502,652, Oct. 22, 1965, abandoned, which is a continuation-in-part of Ser. No. 261,529, March 12, 1963, abandoned, which is a continuation-in-part of Ser. No. 659,196, April 16, 1957, abandoned.

[52] U.S. Cl...... 235/61.7 R, 179/6.3 R, 235/61.8 R
[51] Int. Cl... G06k 5/00, G06k 15/18, H04m 17/02
[58] Field of Search..... 235/61.8 A, 61.8 R, 61.7 B; 179/6.3 R, 6.3 CC, 6.31

[56] References Cited
UNITED STATES PATENTS

| | | | |
|---|---|---|---|
| 3,086,082 | 4/1963 | Fischer | 179/6.31 |
| 3,087,018 | 4/1963 | Pferd | 179/6.3 CC |
| 3,499,117 | 3/1970 | Clark, Jr. | 179/6.3 R |
| 3,560,715 | 2/1971 | Akamatsu et al. | 235/61.8 R |
| 3,588,450 | 6/1971 | LeVon, Jr. | 235/61.8 R |
| 3,609,300 | 9/1971 | Halpern | 235/61.8 A |

Primary Examiner—Daryl W. Cook
Attorney, Agent, or Firm—Townsend and Townsend; Warren P. Kujawa

[57] ABSTRACT

Method and apparatus are provided for assessing the aggregate cost of services rendered to a person, whereby the cost parameters are primarily a distance magnitude, a time magnitude or a combination of both. An electrically or electronically coded token having a prepaid value is employed, whereby the means is provided for reading the prepaid value, determining the aggregate cost of the service, and encoding the token which is the previous value reduced by the cost of services. The token is then returned to the user. The means provided is adapted to determine varying unit rates per time, distance, or both.

20 Claims, 8 Drawing Figures

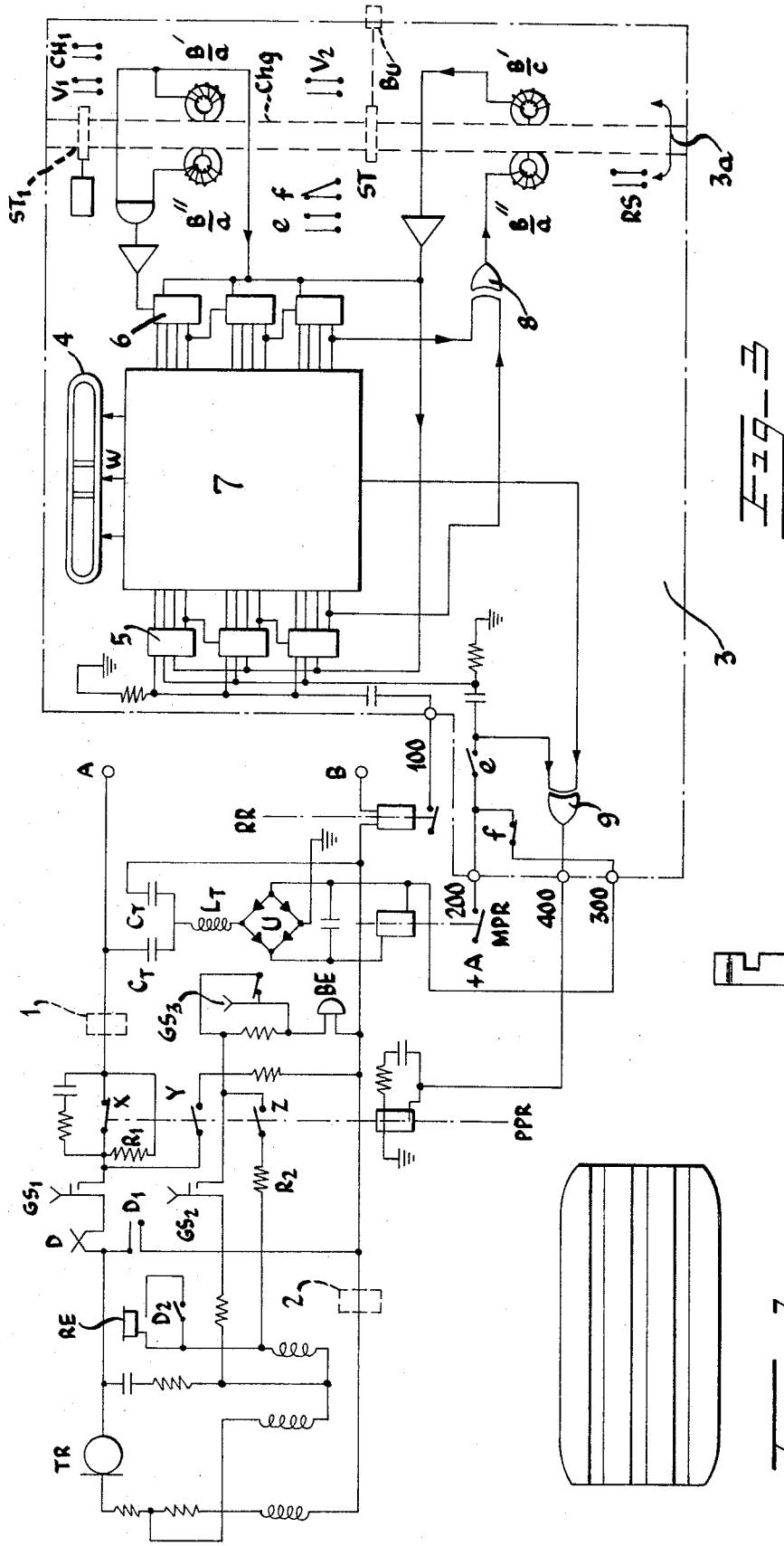

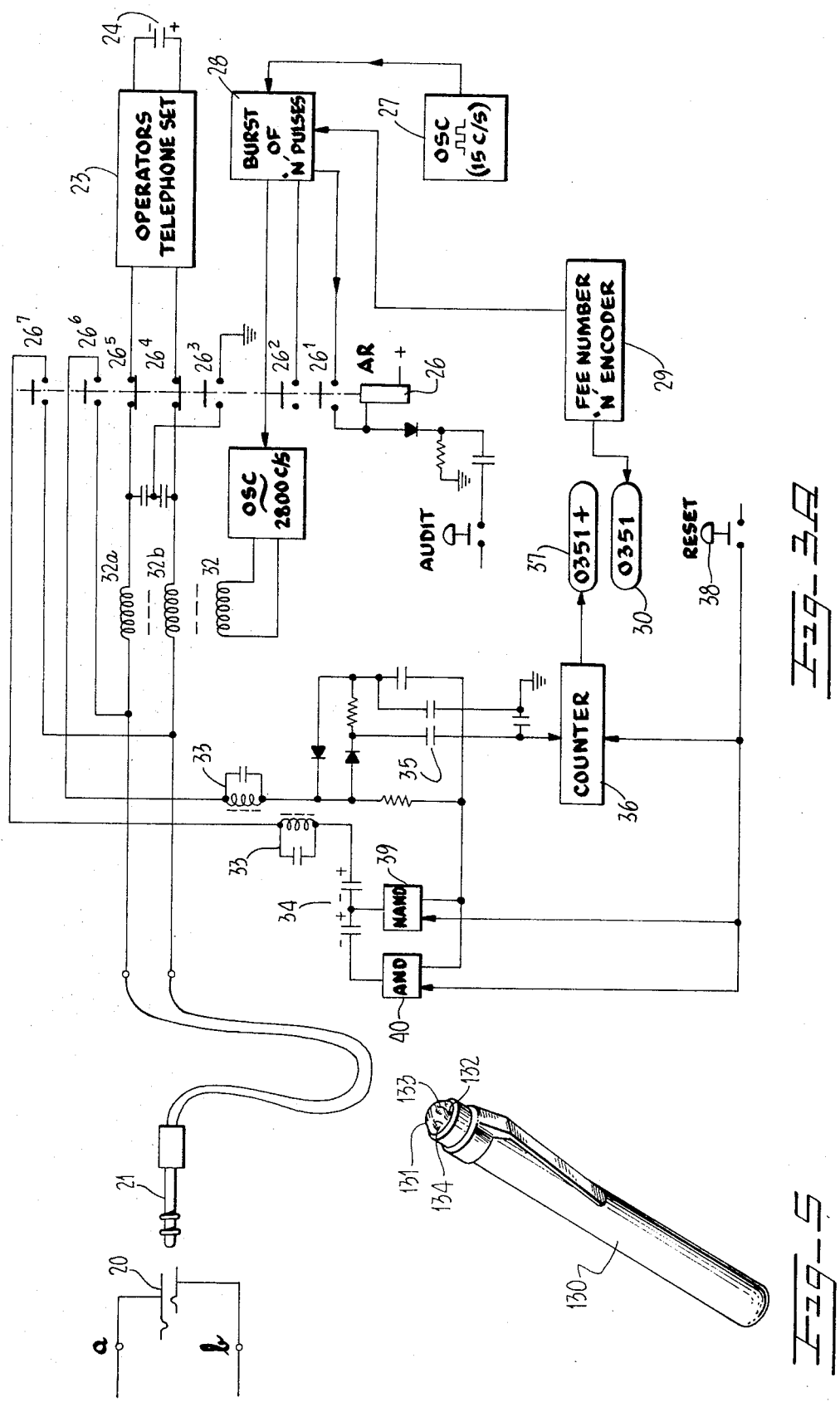

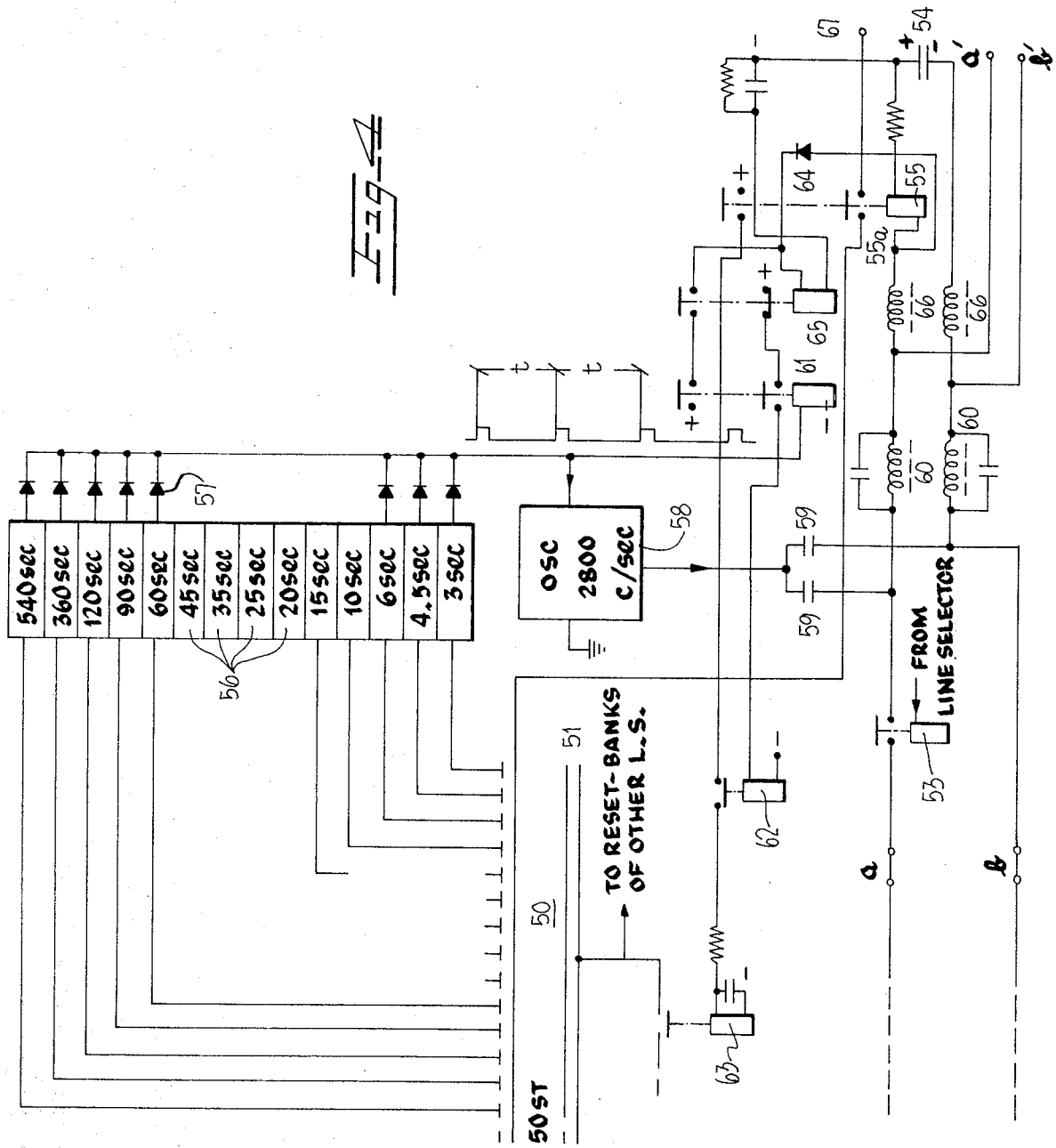

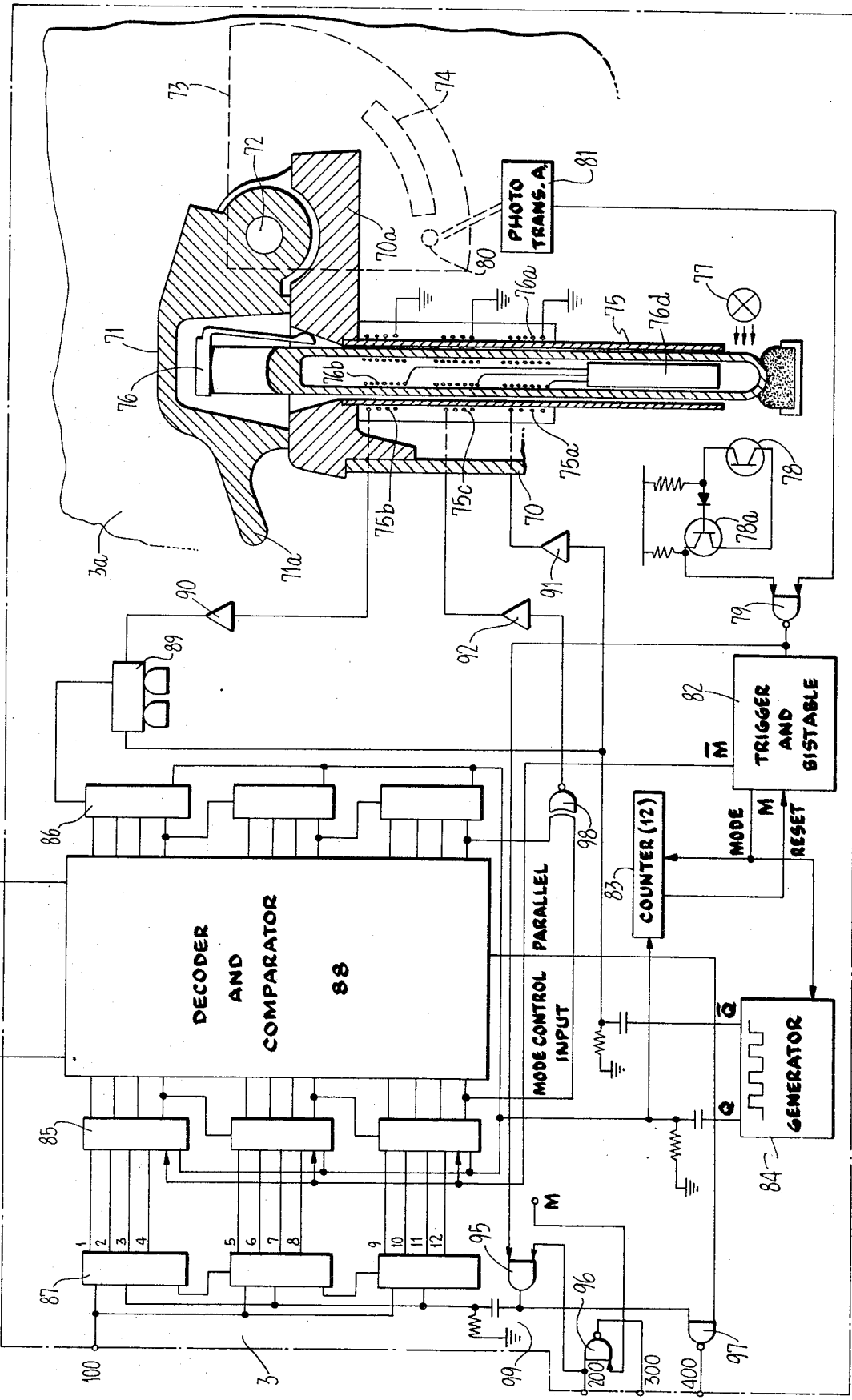

FEE CHARGING SYSTEM

CROSS REFERENCE TO RELATED APPLICATIONS

This application is a continuation of application Ser. No. 197,702 filed Nov. 11, 1971 which is a continuation in part of application Ser. No. 502,652, filed Oct. 22, 1965, which is a continuation in part of application Ser. No. 261,529, filed Mar. 12, 1963, which is a continuation in part of application Ser. No. 659,196, filed Apr. 16, 1957, now abandoned, which is based on British application Nos. 12146/56, 20695/56 and 129/57, now British Pat. No. 857,658.

BACKGROUND OF THE INVENTION

An object of this invention is to provide means for assessing the aggregate cost of services rendered to a person, whereby the cost parameters are primarily a distance magnitude or a time magnitude or a combination of both. Another purpose is to provide a device arrangement that would accept a pay token in which resides information elements indicative of an instanteous value in terms of distance units, time units, or money units, and which device arrangement extracts said information from the pay token to produce new information reflecting a difference between the original token value and the service charge, further to erase or displace the said instanteous value information on the token and to replace or add new information reflecting the residual purchasing or credit power of the pay token. The information elements may again stand for either distance units, time units or money units.

Another object of this invention is to displace coin payment with a value encoded token, which can be repeatedly used, after each use being encoded with a residual value until completely spent, so as to avoid the necessity of a user of a system involving various charges from having the necessary coins of the appropriate amount, or providing means for producing change, where the user has other than the exact amount.

A further object is to provide an efficient, rapid, accurate system for collecting charges subject to varying parameters, such as in transit systems, e.g., commuter trains, buses and the like; telephone systems, charge systems, etc. Another object of this invention is to provide a record controlled data handling means by which it should become possible to reduce money handling operations at charging stations.

As for telephone systems, or other communications systems, it is an object of the present invention to provide a system in which coin payment for operating a device such as the telephone is replaced by a prepaid token.

It is also an object to provide an automatic fee charging system in which coins are replaced by a token containing magnetically recorded value indications and in which means are provided for changing the recorded information so that the value differential which is produced is an exact correspondence of a number of prepaid unit periods minus the unit periods reflecting the service fee charged.

It is a further object to provide an automatic fee charging system in which a record element consists of a plate with recessed tracks relatively deep and at the bottom and/or side walls of which the active coating is placed.

It is similarly an object of the invention to provide a pay token from which the pre-paid data and other data can be read from and recorded into without any relative movement, and which contains the memorizing registers in a fully encapsulated condition.

It is a yet further object to provide an automatic fee charging system for a public telephone in which a record element causes a switch to be actuated when inserted into a token holder and thereby also to maintain the supply of power to the data processing circuit during a call.

It is a still further object to provide an automatic fee charging system in which a pulse reaching a subtraction/shift counter causes a devaluation of a token value temporarily stored therein, by one unit value and in which that process is barred by means indicating the exhaustion of the store.

It is also an object to provide an automatic fee charging system in which there are means for detecting attempts at interfering with the record on the token, and further means for barring any payment from such token.

It is a further object to provide an automatic fee charging system for a public telephone in which there are means for transferring the value data on a token as obtained from the data read devices during a first phase of the registration, to an indicator board at the manual exchange desk to enable an operator to audit the value contents of the token.

It is also an object to provide an automatic fee charging system for a public telephone in which means for checking the validity of a token are provided and for transferring this information by a scanning process to an indicator board at a central exchange desk, and to enable the operator to preset a fee in the data processing circuit at the subscriber station.

SUMMARY OF THE INVENTION

Method and means are provided for displacing the employment of currency by employing an encoded token having an initial value in excess of a single transaction. Depending on the transaction, means is provided for indicating on an encoded token having a residual value initial point information from which a charge is to be calculated — an entry station for a transit system and zero or null time for a communications system. At the end of the transaction, or an incremental portion of the transaction, the charge for the transaction or portion thereof is determined, subtracted from the residual value of the token, and a new residual value indicated. At the termination of the transaction the token is retrieved by the user and encoded with the new residual value and may be used again unitl the residual value is spent or has a value less than a unit charge.

BRIEF DESCRIPTION OF THE SEVERAL VIEWS OF THE DRAWINGS

FIG. 1 shows a view of a pay token which may be employed in a system according to the invention, looking at a grooved face of the token;

FIG. 2 is an end elevation of the token of FIG. 1 showing the depth of the grooves;

FIG. 3 is a circuit diagram of a pay telephone system at the call box end in which payment may be made by means of a pay token;

FIG. 3a illustrates the main elements in the equipment at the Exchange Office end where a manual operator is required to audit the value of the token by remote control, and also to preset a call fee prior to setting up the connection between subscribers;

FIG. 4 illustrates the equipment at a fully automatic Exchange for automatically generating and emitting pay request pulses which have different period rates for different station-to-station distances;

FIG. 5 shows an alternative design for an automatic telephone token;

FIG. 6 shows an example of the mechanical arrangement for receiving and reading a token of the kind illustrated in FIG. 5, and also the circuits interfacing with the telephone circuit at a call box station;

DESCRIPTION OF THE SPECIFIC EMBODIMENTS

Figure 7:
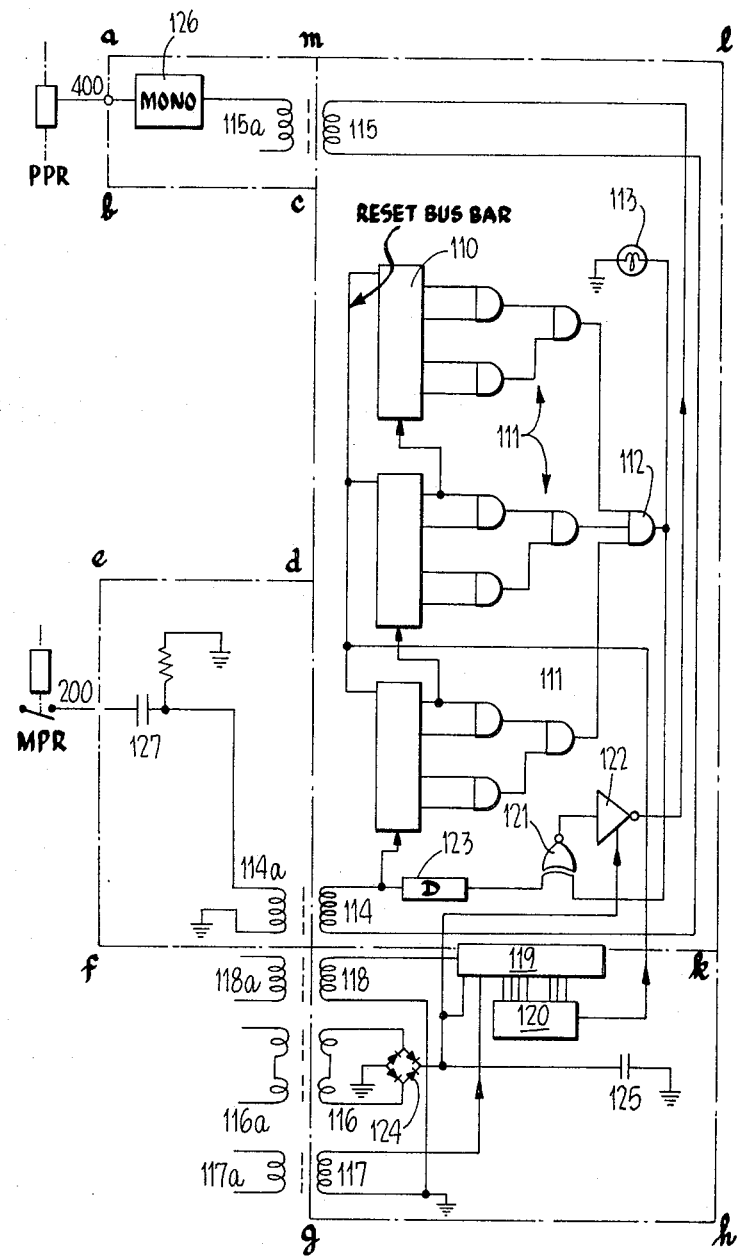
FIG. 7 shows by way of example a simplified block diagram of the circuits which are contained in a coin token of the kind illustrated in FIG. 5.

The subject invention is concerned with method and apparatus for employing an encoded token having an original value in excess of a normal single transaction so as to avoid the use of currency and to provide an efficient and rapid method for determining the charge for a transaction which will vary with a variety of parameters, e.g., time and distance. Depending on the transaction, an initial information point is provided on the token. The user may then carry out the transaction with the charge automatically determined for the transaction in accordance for the various parameters. The residual value of the token is stored, compared to the charge for the transaction, the transaction value subtracted from the residual value of the token and the token returned to the user with the new residual value encoded thereon. Various protective means are provided for insuring authenticity, indicating insufficient value, and the like.

In the applicant's U.S. Pat. No. 3,609,300, which is incorporated herein by reference, this idea has been developed in considerable detail with respect to a public transportation system. Fares are graduated by distance. Passengers instead of paying cash in advance, present, at both journey starting and finishing points, a pay token carrying a value or credit information. Said information would normally exceed the value of a single fare. At a journey finishing point, the distance travelled is evaluated in terms of chargeable value units and the credit recorded on the pay token is reduced by the fare and the result recorded on the pay token.

On mobile vehicles such as buses and taxicabs, the devices for calculating the service charge or fare may be placed into the vehicle. However, it would be equally possible to transmit fare data and pay token data by modulated wireless signals to a center common to the transportation system and to derive from the latter, the computation of the fare prior to its deduction from the value or the pay token, responsive to a request signal from the mobile vehicle. In transit systems with fixed exit stations, various circuitry may be employed for directly determining the charge for the fare from the entry station data and information related to the exit station.

The underlying idea of the subject invention is to replace the use or exclusive use of visible information on a ticket or token such as printed or punched numerals, holes, etc., by a record of tones electromagnetically recorded at audible or supersonic frequencies, or by pulses imprinted on suitable ticker tape, and to cause such tones or pulses to be retained by the ticket or token in the form of distributed magnetic field variations. Broadly conceived, the invention provides a ticket system in which each ticket includes magnetic material for recording information significant of a value of the ticket signifying distance, time, or monetary magnitudes, and in which there are ticket checking means to read from the ticket its value in terms of time, distance, or monetary service units. Included in the invention is means for calculating the aggregate service charge in terms of distance, or money units, and for recording on the said magnetic material of the ticket, a residual ticket value reflecting the initial residual ticket value minus the service charge.

In the transit system, a passenger would have a ticket having an initial or residual value, normally in excess of the charge for the trip. Upon entering the transit system, the ticket would be introduced into an entry station, recorded on the ticket at the entry station would be a series of pulses, the frequency of which would be different, or the pulse order of which would be different for different fare stage zone distances. In practice, the system would work as follows: a ticket holder would have a ticket encoded with a residual value. The ticket holder, upon entering a vehicle or station platform would place his ticket from which the ticket is guided into a machine, where another series of pulses is magnetically or otherwise imprinted and immediately afterwards the ticket is reoffered to the ticketholder. This second signal is now to be characteristic for the starting station or the zone in which the journey was started. When finally, the passenger leaves the vehicle, he places the ticket into another slot from which the ticket is passed onto a reading head, reading the frequency or pulse number of the oscillations present on the ticket.

Each station within a given traffic route would be allocated a definite pulse combination or pulse frequency. A bus driving through different zones of a town would generate in the ticket control machine signals which would alter according to a preset plan, either continuously, or at each point of transit from one zone to another.

The idea of the invention is further to let the three informing elements — the zone distance frequency, prerecorded on the ticket and symbolized in the ticket value, the zone starting frequency, recorded only at the moment the passenger registers his ticket when mounting the vehicle, and the zone exit frequency or other signal, generated by the ticket machine at the moment the vehicle halts at a given stop, or at a fixed exit, act together by electronic means, and to show up by visual indicators, or also by mechanical means, whether the prepaid fare was fully paid, underpaid or overpaid. The said oscillations may also be carried by subsonic pulses to render imitation more difficult. Also, combinations fo audio frequencies may be used to represent a signal. In FIG. 1, an exemplary token is illustrated. The center indentation may have a magnetic track along which magnetic pulses may be recorded representing the value of the ticket. To anticipate the value of this signalment being forged, a separate but closely adjacent checking line can be provided, for example, detectable by photoelectric polarized or non-polarized light sensitive means and the like.

When the passenger leaves the vehicle, he must insert his ticket into another checking machine, say in the vicinity of the driver's seat or at station turnstiles. In this machine, the zone entry signals are electronically compared with the specific zone pulses of the exit station or other exit information, and the results of this comparison is then further compared with the signal on the token, which defines the residual value of the ticket. As a result of these comparisons, the residual value of the ticket may be reduced by the charge for the fare and the ticket holder informed of the residual value of the ticket or that there is insufficient amount for the fare on the ticket.

In effect, then, at the exit station, the exit station compares magnetic material information significant of the point of entry with information significant of the point of exit which relates to the fare charged for the journey, compares this information stored on the ticket as to the residual value of the ticket and subtracts from the residual value of the ticket the fare value for the passenger's journey and then records on the ticket the new residual value. Optionally, the old residual value may be retained or erased.

Besides the transportation system described above, another area of application where distance and time duration determine the charge of a service is the public telephone. It is generally known that telephone fees differ greatly, dependent on the duration of the call and on the distance between the parties communicating. As in public transport, so also in public telephone booths, a convenient and at the same time, reliable method for collecting graduated fares (fees) is still in the embryonic stage.

Accordingly, an additional purpose of this invention is to describe in greater detail a fee charging system in telephone booths, supported by suitable additions to the central exchange equipment using existing communication links, and in which coins are largely replaced by a pay token containing a record of a prepaid or credited purchase value. The record is consecutively updated after each incidence of use. Such procedure, need not, of course, entail the erasure of the record of an initial paid up ticket value, which may be useful to retain as a reference datum.

In spite of the efficiency of the present coin-operated pay-on-call system, it is a source of considerable inconvenience whenever the required combination of coins is not at hand, or has to be searched for. In trunk calls considerable conversation time can be lost by aggregate pay tone periods and associated coin pulse intervals, and though provision is made in the metering technique employed against undue overcharging of the calling subscriber, the loss of paid time must in the aggregate be reflected in higher unit fees to the public or in a smaller return to the telephone company. Also, frequent interruptions are irritating to the calling party, and at times as well to the called party which may not be fully familiar with the causes of these interruptions.

The idea seems timely to investigate the possible provision of a token and system for automatically paying on request and in strict proportion to operator-specified conversation time, or to metering pulses received, and of the possibility of doing this without major changes in the call box stations.

Referring now to FIG. 3, on the left thereof can be seen a simplified subscriber's telephone circuit. A-B are the loop terminals, TR is the transmitter, RE the receiver, $D_1$ D and $D_2$ are the dial contactors. $GS_1$ $GS_2$ and $GS_3$ are contactors on the receiver resting arm which in the drawing are shown in the receiver replaced position. BE is the bell responding to a 17 cs alternating current. $C_T$ $C_T$ are condensers which together with coil 11 form a series tuned circuit responding to 60 csa longitudinal voltages injected in both A and B lines. The relay MPR is energized when the tuned circuit is excited by the said longitudinal voltage variations and develops a non-smoothed d.c. voltage across the relay via the rectifier bridge U. In accordance with the present P.O. practice, longitudinal metering pulses are transmitted to a subscriber's station when he hires private counters. In the context of this proposal, the metering pulse operated relay MPR would for each incoming pulse pass a d.c. voltage pulse to the electronic unit 3.

There is a further relay PPR (pay pulse relay) which is energized by an output from the electronic unit 3. It has three contactors, a break contactor $x$, and two closing contactors, $y$ and $z$. Operating time is adjusted to give a sudden reduction of the loop current for a period of 125 to 300 ms for each output pulse from the electronic unit 3. Resistances $R_1$ and $R_3$ should be in series about 5000 ohms. Resistance $R_2$ should be chosen if possible to permit the earphone RE to receive a fraction of the speech signals while at the same time reducing the cut-off noise, generated when contactor $x$ opens.

The relay RR (resetting relay) is inserted in series with A or B line and responds to a reversal of line voltage or alternatively to a brief increase of line voltage. The latter may be preferable. Its function will be explained in conjunction with operator directed auditing or ticket value checking.

Finally, there are the two squares in interrupted lines marked 1 and 2. "1" symbolizes the coin pulses equipment and "2" the coin slot locking and unlocking relay set, both as used in the latest pay-on-answer coin box system. The intention is to show the possibility of easy integration in a complementary sense of the proposed electronic token pay system and the existing coin pay system. THis does not prevent the other possibility of an exclusive and autonomous application of the proposed electronic subscriber or call box equipment.

The following major components can be distinguished in the electronic unit 3. A guide channel chg through which the token of the type shown in FIG. 1 passes. A relay controlled entry slot stop $ST_1$, and a release button controlled intermediate stop $ST_2$ with trigger button BU. Magnetic reading heads $B'/a$ and $B''/a$ and the lower reading head $B'/c$ and the recording head $B''/c$.

At the entry slot there are contactors $V_1$ and CH which are operated by the ticket or token when it is inserted. As FIG. 1 shows, the edges of the ticket are slanted to facilitate smooth insertion. Near the stop $ST_2$ there are further token operated contactors, namely $e$, $f$, and $V_2$.

There are two registers, 6 being the one into which data derived from the heads $B'/a$ and $B''/a$ are inserted, and 5 being the one which counts and stores the number of metering pulses received from the central exchange equipment. Both registers are to each other related by means of a digital circuit, for example, a comparator and decoder unit 7, such as indicated in FIG. 3. There is also a visual digital display unit 4 which translates the contents of the registers 5 and 6 into readable luminous digits representing the value of the token at the moment of insertion in 6, and the aggregate call fee; a warning lamp $w$ may be added, energized by the comparator 7 when the token exhaustion approaches. The various functional circuit groups are interconnected via logical circuits such as AND, OR, NOR and ANTI-COINCIDENCE circuits, pulse amplifiers and pulse shapers. Finally there are contactors RS near the lower portion of the guide channel Chg. They serve to set zero all the bistables and counters as the token is ejected, to prevent any faulty operation during a subsequent cycle.

The fee-charging system works as follows:

Caller lifts receiver whereby insertion slot $ST_1$ for token is freed. Token is inserted. Contactor $V_1$ is actuated thereby line voltage charges a condenser (not shown) to procure energy for the short-lived counting operation as the token passes the magnetic heads. When the token reaches the midway position at $ST_2$ it closes contactor $V_2$ which henceforth ensures the continuous voltage supply to the electronic part of the system. As already mentioned, the contactors $CH_1$ plays a part only when the token is damaged or for other reasons is mechanically unsuitable for being allowed entry into the guide channel Chg. The said contactor closes then a buzzer circuit.

There is no compelling need for the caller to insert his token immediately after lifting the receiver. He may first dial and await the answer of the called station, and even the subsequent pay tone. Inserting a valid token has the same effect as the inserting of a coin, within the time available before the call is force-released.

To enable the token to have this effect, an output pulse must be obtained from the electronic unit 3 in order to energize, as already indicated, the relay PPR which enables the pay pulse to be sent over the subscriber's loop to his meter control circuit in the exchange. As the drawing shows, the circuit element 9 has a signal input via contactor a and an anti-coincidence disenabling input from comparator unit 7. The output from this OR circuit is connected to the coil of relay PPR. Such subsidiary circuits as amplifiers and pulse extenders are not shown. The comparator produces an output only if for any value level on the counting register 5 which counts the incoming metering pulses (also called "pay-request pulses"), there is no corresponding count level stored in register 6. The requirement for a conversation to begin is therefore that the first metering pulse received from the central equipment should find at least one value unit stored in the register 6. If that is so, the comparator 7 would not generate a signal and not block the passage of the pay request pulse via contactor a to the coil of relay PPR which inserts the resistors $R_1+R_2$ into the call station loop circuit.

Provision must be made for consistent operation irrespective of whether the caller inserts his token after lifting the receiver or only after hearing the pay tone. No problem exists in the former case, but in the latter one a metering pulse may be received by relay MPR before the token value is recorded into register 6. From this contingency arises the necessity to perpetuate the effect of the first metering pulse until the record of the token value is available to the comparator 7. This is done by inserting the break contactor $f$ into a local holding line for relay MPR. At the same time, the other token operated contactor, make contactor $e$, being open before the arrival of the token at its midway channel position, will not pass on any voltage to the input of the anti-coincidence circuit 9. As soon as the token actuates $e$ and $f$, the input pulse is available but by that time the register 6 has received the token data.

Assuming the token as ample value units, the conversation begins, and when the next metering pulse arrives there will be a very short interval only between the arrival of this signal and the pay return pulse to the central equipment. Intelligibility will be impaired for a period of about 250 ms and this could possibly be reduced. It is not likely to constitute a disturbing interruption of the flow of conversation. Each time this reduction of speech level occurs, the calling party will be able to observe an increase by one count of the digital fee indication on unit 4. He will soon understand that these two processes are linked together and would welcome the existence of these non-distrubing information elements reminding him of the rate at which the conversation is being currently charged. When the call charge becomes equal to the token value minus two or three units, it would be desirable to give the caller $a$ forewarning, for example by gently flashing the lamp $W$ in unit 4. Such warning would give the caller time to prepare a second token for insertion or, as the case may be, a coin. If a second token is used, the caller would push the button $Bu$, the used token moves past the heads $B'/c$ and $B''/c$ and is then ejected. During this phase the head $B'/c$ picks up the clock pulses from the token which after amplification are passed to the shift input terminal of both register 5 and 6. As a consequence, the contents of both registers are emptied into anti-coincidence OR circuit 8. Therefore, the output from 8 represents a difference serial signal which is amplified and applied to the write head $B''/c$. This signal over-writes on the value track of the token a new value equal to the original value minus the call charge.

The caller may now insert his second token which will take over payment against incoming pay request pulses in the way explained.

When a call is made to a subscriber who can be reached only through an operator, the necessity arises for the operator to know the value of the token and/or to preset the number of charge units required for a specific call. To this end it is proposed that the operator's normal equipment is supplemented by a number of devices which are illustrated in FIG. 3a.

In FIG. 3a, terminals $a$–$b$ are call box lines ending in the Central Equipment, 20 and 21 are socket and plug connected to the operator's telephone circuit 23 and the central batter 24. 25 is the audit button which the operator depresses to obtain a visual display of the callee's token value. 26 is the audit relay AR which is energized and retained over holding contactors $26^1$. The audit relay has five pairs of make and two pairs of break contactors. The latter disconnect line $a$–$b$ from the operator's set. When $26^2$ closes the unit 28 passes on from oscillator 27. "N" pulses to the oscillator modulator 31. The number "N" can be set by the operator by means of the encoder unit 29; "N" is also displayed by unit 30. The square wave pulses after modulation in unit 31 are inductively injected into the $a$–$b$ lines via identical coils $32a$ and $32b$. Because of this mode of signal injection there is no substantial signal as between wires $a$ and $b$, but only between these wires and earth potential. A battery 34 replaces the battery 24 which has been cut off by break contactors 26⁴ and 26⁵, to maintain the d.c. current during the auditing period, via rejection filters tuned to the frequency of oscillator 31. As to the incoming pay return pulses which consist of a stepped-down d.c. level of the audit current, these have to be converted into a suitable input to a counter unit 36. An example for such circuit is circuit 35. The visual display unit 37 enables the operator to see at a glance whether or not the callee's token has available for payment a minimum of "N" value units which she has set on the encoder 29. If for one reason or another, say because of insufficiency of the callee's token, the intended call is abandoned, the operator must be able to make such changes in the call box station that the pay request pulses entered into register 5 of the call box unit are again deleted, as otherwise the token would be devalued to zero as soon as the callee recovers it. To this end the operator may use the RESET button 38. The effect of pushing theis button is to double the line voltage momentarily. This doubles the line current through terminals A–B (FIG. 3) so that the response threshold of relay RR is overcome and it draws. It applies a reset pulse to the register 5 (FIG. 3). At the same time, (FIG. 3a), the relay 26 is caused to fall off, for example, by applying de-energizing current to a second winding on that relay. This ends the audit. The entire process would last between a fraction of a second for low audit values, and may be a few seconds for high audit values, assuming a pulse rate of 15 per second is used, and highest audit value is $20: an average of 0.3 seconds compares favorably with the time needed for remote auditing of the insertion of coins.

Turning now to FIG. 4 it will be possible to describe the general principles for debiting call office connections at a fully automatic Exchange Station. When the caller dials the first two or three digits in a long-distance call, he determines the general region within which the desired callee can be reached. This number is set up on a uniselector 50 thereby connecting a definite contactor on bank 52 with a definite pulse rate generator 56. Bank 51 has a continuous wiper connection and has a function only when the subscriber connection is to be force-released. As the first pulse passes one of the the diodes 57, it applies an enabling voltage to the oscillator 58 which injects a longitudinally modulated signal into lines a–b via condensers 59—59. Rejection filters 60—60 prevent this signal from reaching callee's lines a'–b'. However, the the d.c. pulse energizes relay 61 which puts positive voltage on relay 62 interrupting positive supply from relay 63, which, however, has delayed fall-off characteristics. In the meantime, in the caller's telephone set, relay MPR has responded to the pay request pulse and tests the value of the token (FIG. 3), PPR responds, inserts a 5,000 ohm resistance into line which suddenly lowers line current. This reduces the voltage drop across relay 55 and resistor 61. This voltage step is detected, if needed amplified and used to energize relay 65 which interrupts the positive supply to relay 62. Relay 65 remains energized until relay 61 falls. This mechanism ensures that relay 63 remains energized if a pay answer pulse step occurs. If, on the other hand, the caller's token has no value left, no pay answer pulse will occur and relay 63 will fall off after a delay of about 3 seconds. As a consequence, negative voltage is applied to the homing circuits of all the selector units involved in the call, and finally also to the homing circuit of uniselector 50, itself.

The purpose of the chokes 66—66 is to prevent short circuiting of the speech signals over battery 54.

In the drawing FIG. 4, the oscillator 58 is said to have a frequency of 28,000 cycle p.s. Dependent on line characteristics other frequencies may be chosen which are less close to the normal speech transmission range.

So far, in our description, we have assumed that the pay token is a plastic tablet having ferric oxide coated surfaces on which value levels are magnetically recorded. This method of reading and writing data requires rather close tolerances to be observed between tablet and the magnetic heads.

An alternative method for reading from a small portable component data and for entering data into it, is now to be described in order to illustrate that the invention is not necessarily limited to the use of telephone tokens having magnetically retentive surfaces.

FIG. 5 shows an example for the novel outer configuration of such an alternative token. It has the shape of a pin into which are placed fully encapsulated memory elements. The memory element may be a magnetic bubble shift register or a complementary MOS semiconductor counter or shift register. Also further logical and protective components may be included in the capsule. Mounted at the top of pen 130 within a protective lens or window 131 are a plurality of indicator lamps 132–134, which are preferably light emitting diodes or the like. Lamps 132–134 are each connected in a manner similar to lamp 113 shown in FIG. 7 to particular outputs of counter 110 via appropriate gating circuitry (not shown) to provide a visible indication that the pay token value lies within a predetermined range or has achieved a threshold value. For example, lamp 132 may be coupled in the manner suggested for lamp 113 in FIG. 7 to provide an indication that the prepaid value in counter 110 is zero. Similarly, lamp 133 may be used to provide an indication that the residual value in counter 110 lies below an arbitrary value, say 5 units, and lamp 134 to provide an indication that the prepaid value in counter 110 lies above the same or a different arbitrary value. This arrangement may be used singly or in conjunction with display indicators 93, 94, shown in FIG. 6, depending on the particular requirements of a given application.

I shall now describe two versions of these devices. A more detailed description of these components and techniques cna be found in my copending application Ser. No. 14,931, filed Feb. 27, 1970 for PROXIMITY DATA TRANSFER DEVICE, now abandoned in favor of application Ser. No. 322,249 for PROXIMITY DATA TRANSFER SYSTEM filed Jan. 9, 1973.

In FIG. 6 one can recognize the enframed part 3 with its sub-section 3a which corresponds to the role and function of 3 and 3a in FIG. 3. The terminals 100, 200, 300 and 400 are identical with those equally marked in FIG. 3, and therefore should be considered connected to the same parts of the telephone circuit shown if FIG. 3.

In sub-section 3a, the token is received. Instead of the guide channel for the moving token, there is now a container 70 having a top cover 70a and a a hinge carrying an axle 72 which is rigidly connected to the turnable lid 71. The vane 73, hidden behind the apparatus wall 3a, is pinned to the axle 72 and swings in the same direction as lid 71 is moved. A plastic sleeve 75 is set into the top cover 70a. On its outside are three coils 75a, 75b, and 75c. When the lid 71 is lifted at handle 71 a a token rod 76 can be inserted into said sleeve, as shown. In its interior, the token has coils 76a, 76b, and 76c, in such a position that they match the positions of the forementioned coils on the sleeve 75. Together they act as pulse transformers. The token contains also an integrated circuit chip 76d which connects to the coils. The system contains two toggle switches. One is actuated when the "data pen" reaches the bottom of its position. A light source 77 normally illuminates phototransistor 78, but when interrupted applies a voltage to AND gate 79. The other toggle switch is made up by light source 80 placed behind the disk 73. As the disk is turned, the slot 74 admits light to fall on phototransistor circuit 81 which applies a voltage to the other leg of AND circuit 79. If both legs have the right logical level, unit 82 is triggered.

The electrical circuit also contains a shift register 85, a counter 87 and another shift register 86; furthermore, a clock pulse generator 84, an n-step counter 83, a flip-flop circuit 89 and diverse gates and amplifiers; finally, the decoder and comparator unit 88 (corresponding to unit 7 in FIG. 3) and the display units 93 and 94.

The system works as follows:

1. Lid 71 is opened

2. Data Pen 76 is inserted; when it reaches bottom, light from source 77 is interrupted and produces by means of transistors 78 and 78a, a voltage applied to gate 79.

3. Lid 71 is closed; as it is being closed, light from source 80 falls on photo transistor 81 which applies logical enabling level to gate 79. Output from AND gate 79 is applied to unit 82.

4. Unit 82 is triggered and develops outputs M and $\overline{M}$. M sets the operating mode for counter 12, and also starts generator 84 which begins to apply clock pulses to the counter 83, as well as to the shift registers 85 and 86. $\overline{M}$ puts the shift register 85 into the serial output mode whereas it is normally in the parallel input mode.

5. Because of the burst of 12 pulses coming from unit 84, shift register 76 d in the token receives the clock pulses to clock out its contents via coils 76b/75b/. These output serial data are amplified in unit 90 and applied to flip flop unit 89 which passes on the data duly phases to the input terminal of shift register 86. As initially both register 85 and 86 contain only zeros, no output pulses are obtained from them or applied to unit 98.

6. The decoder unit energizes the value display 94.

7. If now caller dials a long-distance subscriber, he sets up the central equipment which determines the automatic pulse rate for the pay request pulses.

8. A first pulse arrives at terminal 200 (see also FIG. 3) and, via protective gate 95 and differentiator 99 applies spikes to input of counter unit 87. This up-counter cumulatively stores the pay units which the fee accrued by the call demands. Display unit 93 indicates these continually up-dated fees.

9. If a pay pulse arrives prior to the system being set up, input 200 is returned to 300 and provides holding voltage to the relay MPR (FIG. 3). This is because $\overline{M}$, prior to being set, has a logical level which enables the gate 96, but not when set.

10. The AND gate 97 produces a feedback of each incoming counting pulse to the terminal 400, and thereby to relay PPR (FIG. 3) provided the comparator 88 produces the enabling voltage. This is present as long as the number up-counted in register 87 is smaller than or equal to the number contained in register 86. As already explained, energizing relay PPR is equivalent to sending an acknowledgement to the central Exchange Station that the pay token can be debited for the next pay period. If relay PPR is not energized from a pay request pulse feedback, the call is force-released after a few seconds.

11. When the caller terminates the conversation and replaces the receiver, nothing happens, except that the loop current is interrupted. When the caller lifts the lid to recover his or her token light from source 80 sets phototransistor amplifier 81 and this causes now another burst of twelve count pulses from unit 84. These, as before, are applied to the shift registers 85 and 86 as well as to the coil pair 75a and 76a, which feeds clock spikes into the shift register 76d. Because of the anti-coincidence circuit 98, the difference between the data clocked out from units 85 and 86 respectively is produced which is thus inserted into the register 76d. The clock pulse frequency may be so high that the time for opening the lid 71 is much longer than the time for entering the data in the manner described.

12. Caller recovers his token. Caller may prefer to leave the token in the container and to make several more phone calls in sequence. This would make no difference. At the end of a series of telephone calls, the sum total of all part fees would be deducted from the token. The remnant token value can be made visible by once more closing the lide, to observe the display on unit 94, and only thereafter to withdraw the data pen 75.

If the caller opens the lid during conversation time between pay request pulses, it would not have any effect on the ultimate value of the fee charged. If a new pay request pulse arrives while the lid 71 is open, this would not lead to a loss of said pulse because during this phase the logical voltage level M is applied to the AND gate 96 which provides holding current to relay MPR (compare FIG. 3). When thereafter the lid is closed, this pulse will be processed in the normal way, as described. The previously present counted aggregate in unit 87 and 85 has during the process of opening the lid, been deducted from the contents of register 86 and transferred back to the pay token. As the lid is closed, the new value of the token is entered in 86, and as the caller proceeds with his conversation new call periods are added up in 87. It is believed that the device can be made fool-proof and independent from a very strict adherence to rules by the user of the pay telephone. Concerning the accidental lifting of the lid 71 to which we have referred above, it must be added however that the party concerned must replace the lid within two seconds on arrival of a pay pulse. Otherwise, such call would be force-released. (automatically interrupted)

While the display of the token value may be a welcome convenience to the public it is not an essential ingredient and it renders the equipment somewhat more expensive. It would be feasible to reduce the circuitry required as a fixed attachment to the public telephone, if one agreed that immediate readout is not required in digital form. Instead, readout facilities may be arranged separately for those who wish to know the value of their tokens. For example, such very simple readout units could be provided at Post Offices, or outside the telephone booths, say, one for every five booths.

FIG. 7 shows an example of such a token.

The components inside the rectangular lines m-g-h-l are pen components. They comprise: an up-counter 110, a maximum-count decoder with its output derived from gate 112, an indicator luminous diode 113 which lights up when the register is full to capacity; a set of four inductor coils 114, 115, 116, 117 and 118 which could be replaced by capacitor rings except for the coil 116; a shift register 119; a comparator and decoder 120; an exclusive OR circuit 121, an amplifier 122, a one-clock delay unit 123, a full-wave rectifier 124 and a rechargable long-life battery 125. The entire arrangement is fully encapsulated and contained in a penlike portable component, such as is shown in FIG. 5.

The telephone equipment contains an inkpot-like transducer into which the "pen" is dipped during conversation time. It contains the coil 114a, 115a, and 116a; a differentiator circuit 126 connecting to input terminal 200 (see FIG. 3) and the monostable or pulse extender unit 126 connecting to the relay PPR via the output terminal 400 (compare also FIG. 3).

The system functions as follows:
1. Caller dials intended subscriber.
2. Caller hears pay request peep tones and inserts his electronic pay token into the "inkpot"-like transducer.
3. As soon as the pen is inserted and engages the bottom toggle switch (see also FIG. 6) connection is established between MPR contactor and terminal 200. At the same time, a low power oscillator is connected to the two half coils in counterwound configuration 116 a causing alternating voltages to be induced in the (similarly counterwound) half coils 116. By winding these inductor coils in this fashion, spurious magnetic fields would not be able to generate any output across two way rectifier 124. This element generates the voltage source for the pulse amplifiers and the enabling levels for the protection gates. It also charges the battery 125 which is used exclusively for maintaining the state of memory in the register if it is a semi-conductor type.
4. As a pay request pulse arrives at input terminal 200, a voltage spike passes through coil 114 and produces up-count by one in the counter 110. At the same time, it actuates the one-clock monostable delay unit 123 which passes the pulse through the exclusive NOR unit 121 to the amplifier 122 and coils 115-115a. The monostable 126 extends the duration of the output pulse sufficiently to actuate the relay PPR which produces the pay answer pulse.

A token having been used up, means that the counter 110 is filled to capacity and there is an output from AND gate 112. The lamp 113 is alight, visible to the caller. At the same time, the logical level derived from AND gate 112 is such that it bars the exclusive NOR circuit 121 from passing any pulse to the amplifier 122. In other words, when the counter is filled, no pay-return pulse can be produced and the caller must either insert a new data pen or the Central Equipment would forcibly interrupt the call.

As shown in FIG. 5, there may be three different light diodes molded into the lens at the top of the data pen. There may be a green diode indicating the pen is fully charged, a yellow diode emission to indicate the token value has dropped to a certain level; and finally a red light diode, which when lit indicates to the caller that the token is exhausted and should be "recharged".

Physically, renewing the data pen is a simple process in that an internal voltage must be generated which would step up the counter by one single step. This would result in all zeros. However, this spike cannot reach the memory via the usual inductive channels. It can only be internally generated responsive to the receipt of a very special signal, namely to the injection into the component of a secret check number. This check number enters via coil 118A-118 and clock 117a-117. Once the signal is stored in shift register 119 it is compared with that of unit 120. The comparator output in the case of pattern agreement is passed to the reset bus bar of the counter which zeros all count bistables.

A technique of this kind would be virtually impossible to imitate fraudulently, as there is no pattern readout from the token.

This fact makes the device immune to unauthorized recharging.

The entire circuit comprised within the telephone token pen may be made in the form of a single chip. For telephone pay tokens, only the telephone corporations would be able to produce exchange pens or to charge the pens. Probably it would be safer to issue ready-made newly recharged pens and draw in the used ones. The latter may then be recharged in a separate room not accessible to the public. Post Offices may be instrumental in assisting the public to obtain telephone pay tokens in the same way as stamps are sold. Remnant values in pens can be read out on digital displays and such credit as exists can be credited towards the price of a new telephone pay token pen.

It would however be within the scope of the technique to design fully automatic pay token recharging units, for self-service by the general public.

What is claimed is:

1. An apparatus for the automatic changing of service fees in pay token operated stations, with the pay token having a recorded value, wherein a service charge is determined as a function of units expended including:
   a. means for translating numbers of units expended into numbers of service charge units;
   b. means for storing said service charge units in a first memory circuit;
   c. means for reading and storing the recorded value of a pay token in a second memory circuit;
   d. means for relating the contents of said first memory circuit and said second memory circuit, so as to derive a residual value as a difference signal representing the recorded value of the pay token minus the service charge; and
   e. means for replacing said value of the pay token by said residual value.

2. An apparatus for the automatic charging of service fees in pay stations, having communication lines between telephone exchange equipment and call box equipment, employing a pay token having electrically operable means for storing data including:
   a. a generator of pay pulses in the exchange equipment, the pulse rate of which is proportional to the call charge per unit of time;
   b. a pay pulse receiving means for selectively receiving the pay pulses and converting them into input signals of a pulse counter;
   c. a first pulse counter to receive and store said input signals;
   d. receiving means for positioning the pay token;

e. sensor devices which are included as a part of the receiving means for reading data from the data storage means on the pay token and producing an electrical signal reflecting a prepaid value;

f. a second pulse counter to receive and store prepaid value data from the pay token; and g. a comparator to compare the contents of the first and second pulse counters.

3. An apparatus for automatic charging of service fees as set forth in claim 2, wherein are included:

a. a gating circuit connected to comparator output terminals which are operative in controlling the gate so as to pass a "pay-answer" pulse for transmission over the communication line to the central equipment when the contents of the second pulse counter is equal or larger than that of the first counter.

4. An apparatus for the automatic charging of service fees as set forth in claim 2, wherein:

a. the pay pulse receiving means is a tuned circuit, and the converting means is a rectifier and a first relay.

5. An apparatus for the automatic charging of service fees as set forth in claim 4, wherein said call box has a transmitter, comprising:

a. a second relay for receiving the pay-answer pulse to insert a resistance between communication lines and call box transmitter and receiver, so as to reduce the d.c. current level for the duration of a pay-answer pulse.

6. An apparatus for the automatic charging of service fees in pay stations, as set forth in claim 2, including:

a. interrogation means in the Exchange equipment for transmitting a desired number of pay pulses to the pay station equipment;

b. means in the telephone exchange equipment for counting, storing and displaying "pay-answer" pulses echoed from the pay station.

7. An apparatus for the automatic charging of service fees in pay stations, as set forth in claim 6, including:

a. means in the telephone exchange equipment for resetting the pay pulse counter in the pay station.

8. An apparatus for the automatic charging of service fees in pay stations, as set forth in claim 7, wherein:

a. the resetting means is a third relay responsive to an increase in the d.c. current in one of the wires of the communication line.

9. An apparatus for the automatic charging of service fees in pay stations, as set forth in claim 2, including:

a. a rest position for said pay token in which it neither transmits nor receives data;

b. a manual trigger button arranged on actuation to release the token from its resting position to recover the token.

10. An apparatus for the automatic charging of service fees in pay stations, as set forth in claim 9, including:

a. current supply circuits actuated by said pay token, when in its resting position, to furnish operating power to the counters, comparator, and sensor devices of the fee charging apparatus in the pay station.

11. An apparatus for the automatic charging of service fees in pay stations as set forth in claim 2, including:

a. display means to show to the pay station user the contents of the pay pulse counter in digital form.

12. An apparatus for the remote charging of service fees in pay stations as set forth in claim 2, including:

a. display means to show to the pay station user the contents of the pay token value counter.

13. An apparatus for the remote charging of service fees in pay stations as set forth in claim 2, including:

a. indicator means to indicate when the pay pulse counter approaches the count level of the token value counter.

14. The apparatus of claim 13 wherein said indicator means comprises a plurality of lamps coupled to the data token storing means for indicating the status of the contents stored in the pay token relative to a predetermined threshold value.

15. An apparatus for the remote charging of service fees in pay stations, as set forth in claim 2, wherein:

a. the electrically operable storage means on the pay token is a layer of magnetically susceptible material, and the sensor means are magnetic read/write heads.

16. An apparatus for the automatic charging of service fees in pay stations as set forth in claim 2, including:

h. difference means for producing signals reflecting the difference between the contents of the pay pulse counter and the contents of the token value counter;

i. recording means coupled to said difference means for recording in the token said signals reflecting said difference; and j. sensor means for initiating operation of said difference means.

17. The apparatus of claim 16 wherein said receiving means provides a rest position for said pay token in which said token neither transmits nor receives data and includes a manual trigger button arranged on actuation to release the token from its resting position to recover the token; and wherein said sensor means includes means exposed to the token after having been released from its resting position for generating an operation initiating signal for said difference means.

18. The apparatus of claim 16 wherein said sensor means includes manually actuatable means for generating an operation initiating signal for said difference means.

19. A system for the automatic charging of service fees in pay stations, having communication lines between telephone exchange equipment and call box equipment, said system comprising:

a. a generator of pay pulses in the exchange equipment, the pulse rate of which is proportional to the call charge per unit of time;

b. pay pulse receiving means associated with said call box equipment for selectively receiving said pay pulses and converting said pay pulses into call box output signals;

c. a pay token having a vlaue storing counter;

d. receiving means for positioning said pay token;

e. sensor means included in said receiving means for converting said call box output signals into pay token input signals;

f. means in said pay token for altering the value stored in said counter in response to said input signals;

g. means in said pay token for generating a signal in response to said input signals when said value in said counter exceeds a pre-determined threshhold value; and h. means responsive to said token output signals for generating a pay answer pulse for transmission over the communication lines to the exchange equipment.

20. The apparatus of claim 19 including means for replenishing the recorded value in the pay token counter to a predetermined maximal value, said means including means for generating a coded signal, and means for transferring said coded signal to said pay token; and wherein said pay token includes comparator means for generating a replenishing signal in response to the receipt of said coded signal.

* * * * *